United States Patent
Tranquilli, Jr. et al.

(10) Patent No.: US 11,476,969 B1
(45) Date of Patent: Oct. 18, 2022

(54) RADIO FREQUENCY DECEPTION NETWORK

(71) Applicant: BAE SYSTEMS Information and Electronic Systems Integration Inc., Nashua, NH (US)

(72) Inventors: John A. Tranquilli, Jr., Amherst, NH (US); Joshua D. Niedzwiecki, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 386 days.

(21) Appl. No.: 16/826,353

(22) Filed: Mar. 23, 2020

(51) Int. Cl.
*H04K 3/00* (2006.01)
*H04B 7/024* (2017.01)

(52) U.S. Cl.
CPC ............. *H04K 3/822* (2013.01); *H04K 3/60* (2013.01); *H04K 3/825* (2013.01); *H04B 7/024* (2013.01); *H04K 2203/34* (2013.01)

(58) Field of Classification Search
CPC ........... H04K 1/00–10; H04K 3/00–94; H04K 2203/34; H04B 7/024
See application file for complete search history.

(56) References Cited

U.S. PATENT DOCUMENTS

| | | | |
|---|---|---|---|
| 2002/0166063 A1* | 11/2002 | Lachman, III | H04L 63/1458 713/188 |
| 2010/0050259 A1* | 2/2010 | Christofferson | H04H 20/12 726/23 |
| 2014/0226789 A1* | 8/2014 | Bendahan | G21K 1/043 378/86 |
| 2017/0074962 A1* | 3/2017 | Badawy | G01S 3/38 |
| 2018/0003800 A1* | 1/2018 | Shollenberger | H04K 3/86 |
| 2018/0006760 A1* | 1/2018 | Shollenberger | H04K 3/65 |
| 2019/0067812 A1* | 2/2019 | Abuasabeh | G11B 20/10527 |

FOREIGN PATENT DOCUMENTS

| CA | 2475794 A1 | 2/2005 |
|---|---|---|
| WO | 03041218 A1 | 5/2003 |

OTHER PUBLICATIONS

"Under Skyborg Program, F-34 and F-15EX jets could control drone sidekicks" Valerie Insinna, Defense News (Year: 2019).*
Colombi, John & Bentz, Bryan & Recker, Ryan & Lucas, Brandon, "Attritable Design Trades: Reliability and Cost Implications for Unmanned Aircraft", IEEE International Systems Conference, Apr. 2017, 9 Pages, Baltimore, Maryland.

* cited by examiner

*Primary Examiner* — Raymond S Dean
(74) *Attorney, Agent, or Firm* — Maine Cernota & Rardin; Scott J. Asmus

(57) ABSTRACT

A distributed transmit platform deception network array system includes a plurality of platforms; each platform comprising at least one transmitter; wherein the platforms are in a geographically distributed configuration with respect to each other and at least one victim receiver; a propagating wavefront is generated by the transmitters of the plurality of platforms toward the at least one victim receiver according to deception target characteristics for each identified victim receiver; whereby the propagating wavefront is controlled, and a false location is determined by the victim receiver, Whereby detection of a deception at alternate receiver locations is minimized by selection of characteristics of the transmitted waveform.

15 Claims, 7 Drawing Sheets

ENVIRONMENT

15 PLATFORM-PLATFORM SPATIAL RELATIONSHIPS FOR N = 6

SYSTEM BLOCK DIAGRAM

PLATFORM TRANSCEIVER COMPONENTS

500

|  | PLAT. 1 TIMING / AMP/ MOD | PLAT. 2 TIMING / AMP/ MOD | PLAT. 3 TIMING / AMP/ MOD | PLAT. 4 TIMING / AMP/ MOD | PLAT. 5 TIMING / AMP/ MOD | PLAT. 6 TIMING / AMP/ MOD |
|---|---|---|---|---|---|---|
| RCVR A | 1A(T/A/M) | 2A(T/A/M) | 3A(T/A/M) | 4A(T/A/M) | 5A(T/A/M) | 6A(T/A/M) |
| +RCVR B | 1AB(T/A/M) | 2AB(T/A/M) | 3AB(T/A/M) | 4AB(T/A/M) | 5AB(T/A/M) | 6AB(T/A/M) |
| +RCVR C | 1ABC(T/A/M) | 2ABC(T/A/M) | 3ABC(T/A/M) | 4ABC(T/A/M) | 5ABC(T/A/M) | 6ABC(T/A/M) |

WAVEFORM CHARACTERISTICS FOR N = 6

FIG. 5

RESULTS

METHOD

RADIO FREQUENCY DECEPTION NETWORK

FIELD

The following disclosure relates generally to passive location deception systems and, more particularly, to a novel technique for use with a distributed transmit network array device, method, or system.

BACKGROUND

With the advent of passive detection systems and phased arrays, traditional single platform approaches to electronic warfare and location deception have been challenged. Current responses to these passive detection systems include decoys, cyber-responses, and distributed electronic warfare. The decoy approach places an expendable system in the location where it is desired for a target to appear. This decoy becomes a sacrificial lamb. For the cyber approach, techniques gain control of the target, and a spoofed location is injected at the desired location. The drawbacks are the likely destruction of the decoy system and the requirement for cyber access to the target. Existing distributed electronic warfare approaches use the geographic distribution of elements to prevent the passive systems from accurately locating individual elements (or a protected entity).

What is needed is a device, method, and system to deceive a victim receiver such that actual propagating wavefronts at the victim receiver's array are indistinguishable from that which would occur as a result of a transmitter being at a location where no actual transmitter exists; in addition, where the temporal structure of the waveforms further reduce the likelihood that a receiver in any other location (other than the victim receiver's location) would be able to detect the deception.

SUMMARY

An embodiment provides a distributed transmit platform deception network array system comprising a plurality of platforms; each the platform comprising at least one transmitter; wherein the platforms are in a geographically distributed configuration with respect to each other and at least one victim receiver; a propagating wavefront generated by the transmitters of the plurality of platforms toward the at least one victim receiver; whereby the propagating wavefront is controlled according to deception target characteristics for each the at least one victim receiver, and a false location is determined by the at least one victim receiver; and whereby detection of a deception at alternate receiver locations is minimized by selection of characteristics of the transmitted waveform. In embodiments the platforms comprise towers comprising the transmitters, providing base defense electronic warfare. In other embodiments, generating the transmissions by the platforms comprises performing an optimization over their transmit signals. In subsequent embodiments the victim receiver comprises a passive receiving detection system. For additional embodiments the system comprises coherent transmit beamforming. In another embodiment, the victim receiver comprises a phased array. For a following embodiment the platforms comprise at least one attritable platform. In subsequent embodiments the platforms comprise at least one Tier II Medium Altitude, Long Endurance (MALE) platform. In additional embodiments the platforms comprise a swarm of drones. In included embodiments the transmission comprises persistent flight of the plurality of platforms. Yet further embodiments comprise Digital Radio Frequency Memories (DRFM) units. In related embodiments the plurality of platforms comprises autonomous unmanned aerial vehicles (UAVs). For further embodiments the plurality of platforms comprises unmanned aerial vehicles (UAVs) capable of hovering. In ensuing embodiments the plurality of platforms are beyond a range of victim target weapons.

Another embodiment provides a method for distributed transmit platform deception comprising initiating controller operation; identifying a victim receiver; entering victim receiver characteristics including location; determining if all victim receivers have been identified; if yes, continue, if no, return to identifying a victim receiver; determining deception target characteristics for each identified victim receiver; determining combined wavefront characteristics required; determining number of platforms to be used; determining each platform's relative location; determining platform waveform characteristics required for each platform; deploying platforms; locating each platform with respect to the/each victim receiver according to interrelationships to define the combined wavefront; configuring each platform's transmission characteristics for each predetermined platform wavefront; and transmitting synchronized predetermined platform wavefront from each platform. For yet further embodiments, the method comprises calibration of direction finding equipment. For more embodiments, the method comprises performing an optimization over transmit signals' amplitude and phase modulation given their locations. Continued embodiments include determining deception target characteristics for a plurality of identified victim receivers. For additional embodiments, the method comprises transmissions comprising targeted time-aligned waveforms from each of the distributed platforms to create a pulse at an arbitrary time at different locations, relying on this gain to make intended deception pulses easy to detect while suppressing detection of interference from signals intended for other locations.

A yet further embodiment provides a distributed transmit platform deception network array apparatus comprising a plurality of unmanned aerial vehicle (UAV) platforms; a controller comprising at least one transceiver and antenna for controlling the plurality of platforms, the controller determining deception target characteristics for each identified victim receiver; each the platform comprising at least one transceiver and antenna; wherein the platforms are in a predefined spaced-apart configuration with respect to each other and at least one the victim receiver; a propagating wavefront generated by the transmitters of the plurality of platforms toward the at least one victim receiver according to the deception target characteristics for each the identified victim receiver; whereby the propagating wavefront is controlled, and a false location is determined by the at least one victim receiver.

BRIEF DESCRIPTION OF THE DRAWINGS

FIG. 5 depicts a table of waveform characteristics configured in accordance with an embodiment.

Figure 1:
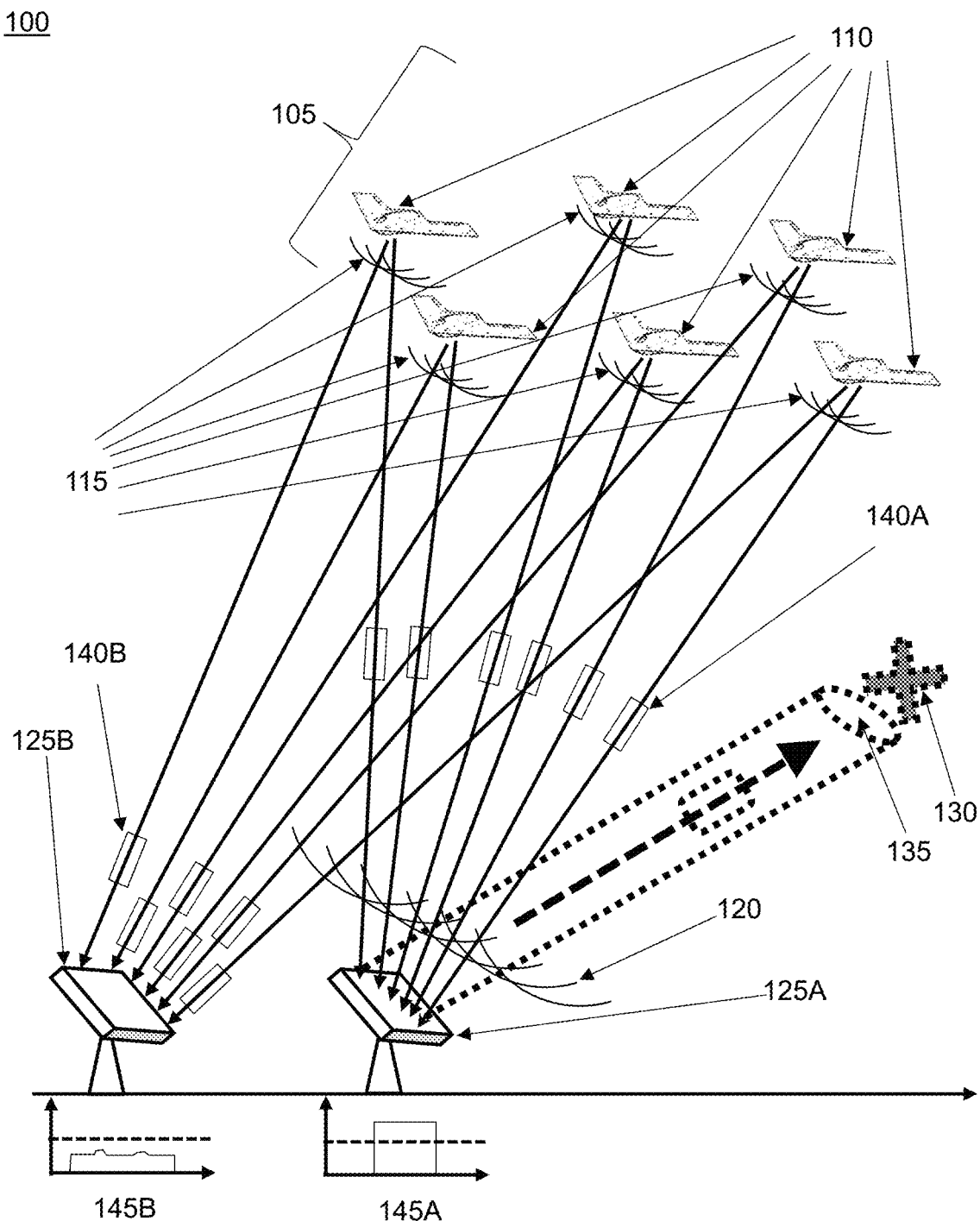
FIG. 1 depicts a radio frequency deception network environment configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments overcome the problems associated with prior responses to passive detection systems. Embodiments employ coherent transmit beamforming from distributed platforms. This provides the ability to gain control of propagating wavefronts. With a distributed array of potentially small and attritable platforms, a deception network is created that is able to subject a victim receiver to a propagating waveform that appears to be coming from a location where no emitting RF source even exists. "Attritable" defines a design trait that trades reliability and maintenance for low-cost, optionally-reusable, eventually expendable, systems. Embodiments enable sophisticated spoofing/deception techniques against a class of passive location systems. For example, embodiments further use waveform temporal characteristics (time alignment of pulses) to reduce the probability of another receiver detecting the deception.

Embodiments create plane waves incident on a receiving location that appear to come from a direction in which no source exists. Outside of radio deception, this technique can be used to aid calibration of Direction Finding (DF) equipment by enabling multiple sources to produce signals intended to be DF'd at different places without requiring movement of the platform or the calibration sources.

Provided that the location of the victim receiver is known (through intelligence collection means), and the distributed platforms synchronize their clocks and transmissions, embodiments perform an optimization over the transmit signals (amplitude and phase modulation) given their locations to coherently combine in a target region. For embodiments, this region can be broadened at a small sacrifice to quality of the deception to cover potential uncertainties in the receiver's location. Similarly, by superposition, if power constraints can be handled, the platforms can achieve this result to multiple victim receiver locations simultaneously. Considerations include compensating for local multi-path propagation channels which may cause interference which may reduce the quality of the deception; however, embodiments may still cause significant confusion and uncertainty in the target. For increasing frequencies, the area of quality deception decreases (as it also does based on geometries). In embodiments, performance degradation is mitigated by control of the distributed platforms' locations. Embodiments benefit from coordination among the distributed platforms, as geometry plays a role in the quality of the deception. In embodiments, distributed battle management tools integrate requirements/constraints of this technique in the planning of missions.

Embodiments employ Direction Of Arrival (DOA) deception. The employed distributed coherent beamforming enables embodiments to perform deception by Time Difference Of Arrival (TDOA) as well. Implementation comprises Continuous Wave (CW) distributed coherent beamforming. Regarding alignment, squared power gain is obtained. This creates an average power difference of $10*\log10(N)$, where N is the number of contributing transmitters, when comparing the area of alignment to everywhere else (side lobes). However, if pulsed waveforms are used, gain is closer to $20*\log10(N)$ because not only will the wave fronts interfere in other areas, they also will only overlap in time in the region of the interest. In this case, temporal waveforms reduce the probability of detecting the deception at other receiver locations. Embodiments transmit targeted time-aligned waveforms from each of the distributed platforms to create a pulse at an arbitrary time at different locations, relying on this gain to make the intended (deception) pulses easy to detect while suppressing detection of the interference from the signals intended for other locations. Regarding geometry, in general, the more distributed the group of contributing platforms, the better this technique works because the differential path delay to various locations is greater. The spatially broader network improves performance. It is the corollary of direction: for good direction deception capability, a good spread of directional baselines is needed in regard to the area of interest, for good time deception capability, a good spread of differential delays is needed to the areas of interest.

FIG. 1 depicts a radio frequency deception network environment 100. Shown is a network 105 of spatially distributed platforms 110. Each platform 110 transmits its own characteristic RF signal 115 comprising a predetermined wavefront. Wavefronts 110 combine, resulting in coherent transmit beamforming and a combined wavefront 120 at victim receiver 125A, resulting in victim receiver 125A perceiving a nonexistent target 130 at location 135. In embodiments, the platforms are moving, even with high velocity, provided that the velocity is well known/estimated. For embodiments, platforms 110 hover, and are fixed with relation to each other and victim receiver 125A. In embodiments, there are multiple victim receivers 125A, 125B. For other embodiments, with superposition, each victim receiver 125A, 125B detects the same nonexistent target 130 at a location 135. As mentioned, embodiments transmit targeted time-aligned waveforms 140A from each of the distributed platforms to create a pulse 145A at an arbitrary time at different locations, relying on this gain to make the intended (deception) pulses 140A easy to detect while suppressing detection of the interference 140B from the signals intended for other locations 145B. In yet other embodiments, each receiver sees different targets. Not depicted, but spatially distributed platforms can comprise fixed-location transmitters on towers.

Figure 2:
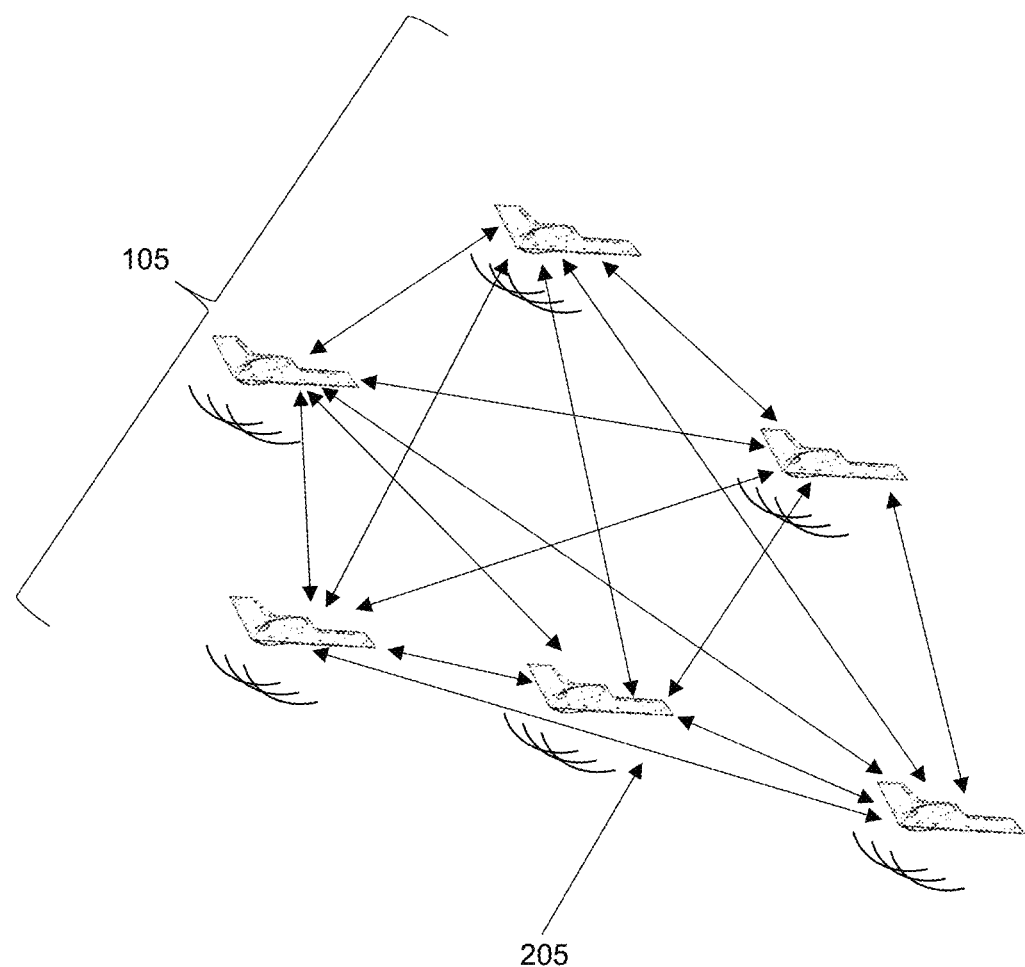
FIG. 2 depicts inter-platform spacing configured in accordance with an embodiment.

FIG. 2 depicts inter-platform spacing 200. Fifteen platform-platform spatial relationships 205 exist for N=6 platforms of network 105. Platform-platform spatial relationships 205 are important because, as the separation and network spatial extent increases, deception performance increases.

Figure 3:
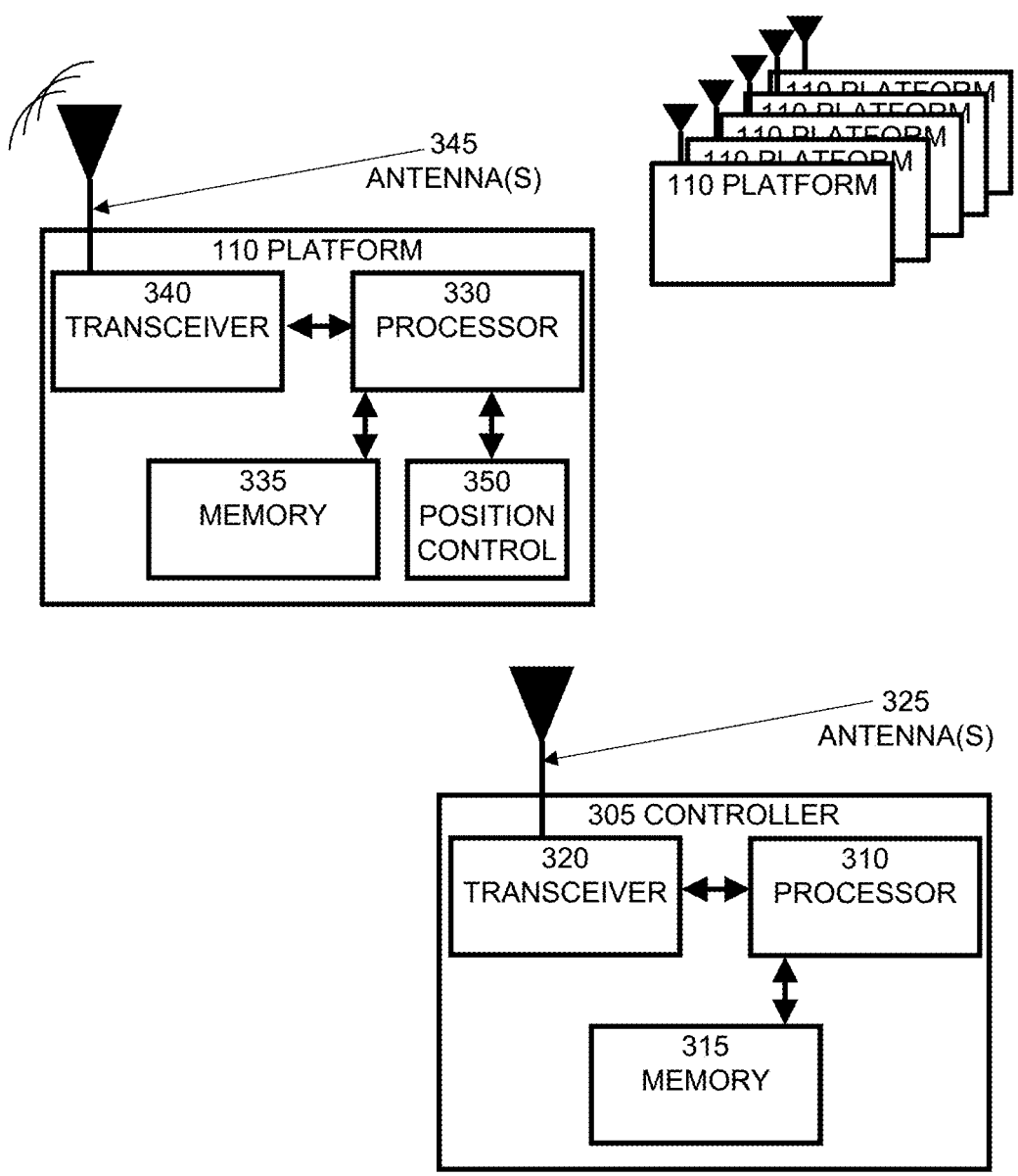
FIG. 3 depicts a system block diagram configured in accordance with an embodiment.

FIG. 3 depicts a system block diagram 300 of components of a distributed transmit platform deception network array. Controller 305 comprises processor 310, memory 315, transceiver 320, and antenna(s) 325. Each platform 110 comprises processor 330, memory 335, transceiver 340, antenna(s) 345, and position control 350. In embodiments, controller 305 is airborne, in other embodiments controller 305 is land (such as towers) or water-based.

Figure 4:
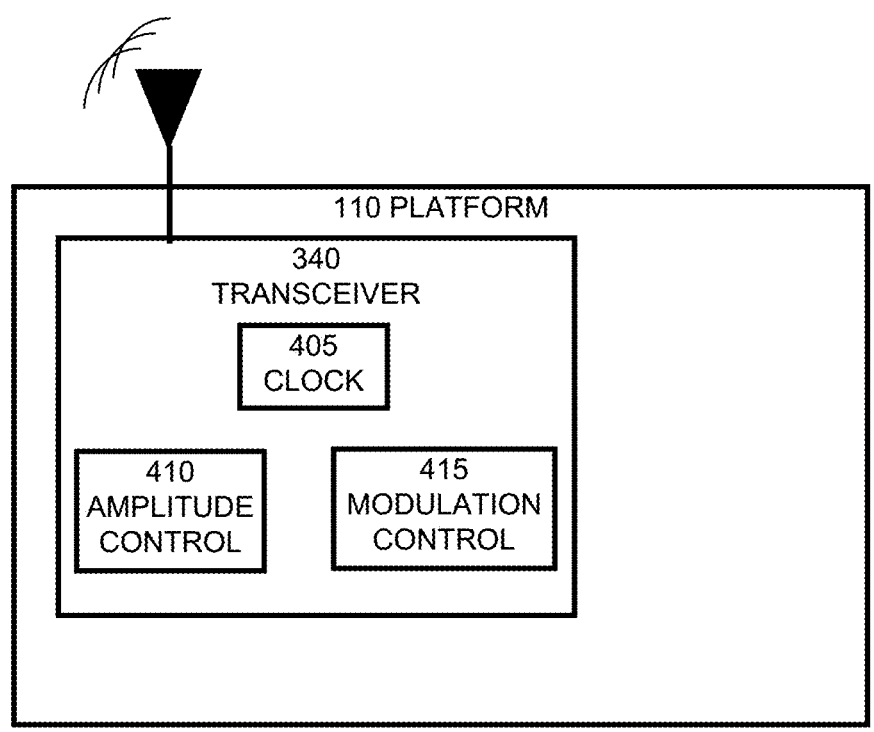
FIG. 4 depicts platform transceiver components configured in accordance with an embodiment.

FIG. 4 depicts platform transceiver components 400. Components comprise clock 405 for timing; amplitude control 410 for waveform determination; and modulation control, including time, 415 for waveform determination.

FIG. 5 depicts a table 500 of waveform characteristics for the platform network to create the combined wavefront 120. Each platform has defined timing, defined amplitude, and defined modulation. For multiple victim receivers (A, B, C), each platform will have a different defined timing, defined amplitude, and defined modulation. Here, the number of platforms, N, equals six.

Figure 6:
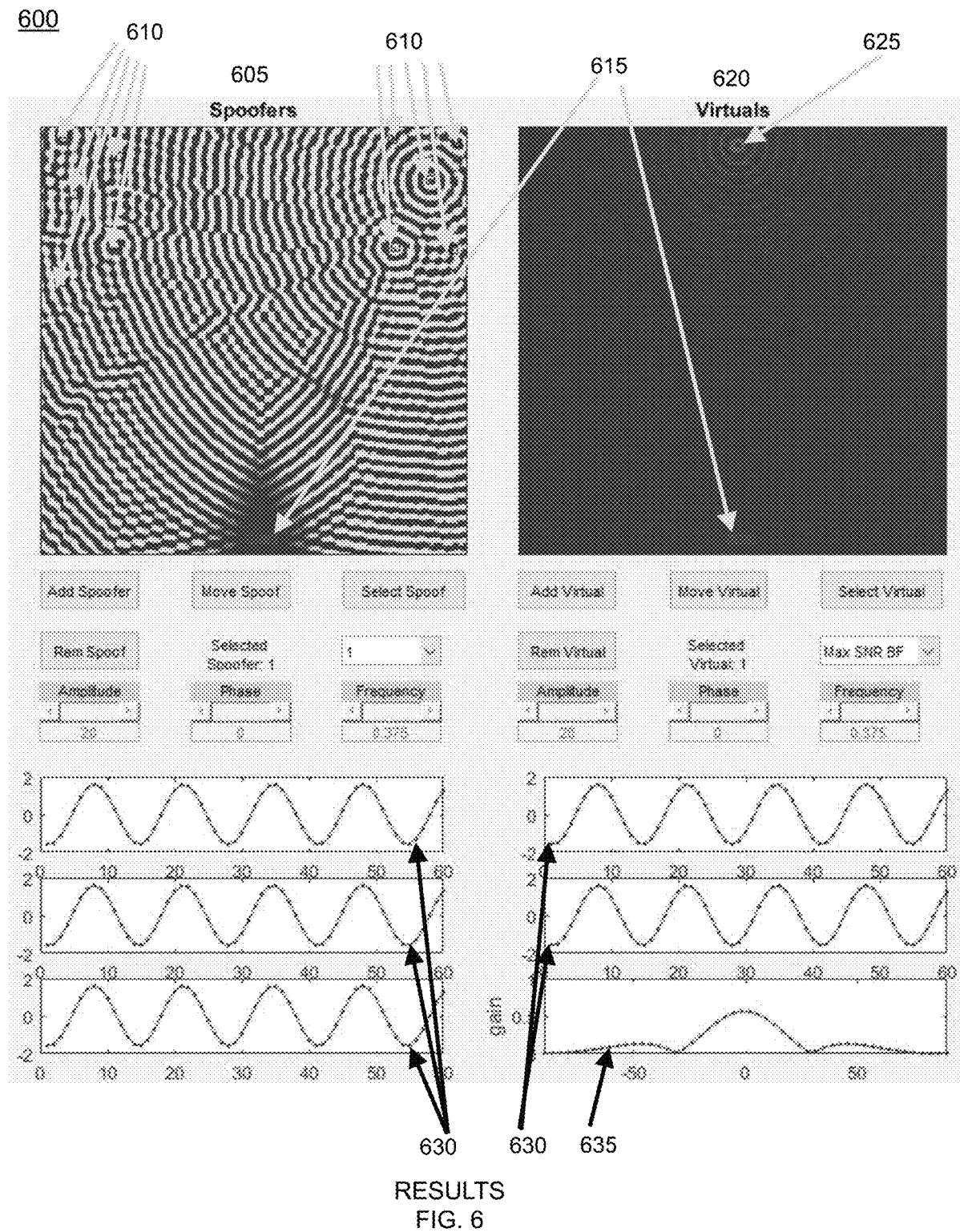
FIG. 6 depicts results for a radio frequency deception network configured in accordance with an embodiment.

FIG. 6 depicts results 600 for a radio frequency deception network. Spoofers graphic 605 on the left depicts ten (N=10) individual spoofers 610 directed to victim receiver 615. Virtuals graphic 620 on the right depicts the resultant virtual 'ghost' target 625. The time domain samples (of phase information) are shown as a line 630 (for what a signal from the virtual location would produce) and a (superimposed) dotted line 630 (produced by the deception network). Bottom right plot 635 shows the resulting angle of arrival (using the MUltiple SIgnal Classification (MUSIC) algorithm) produced by the victim receiver (again, solid for what would be produced from the virtual target, and dotted for what the network produced at the victim).

Figure 7:
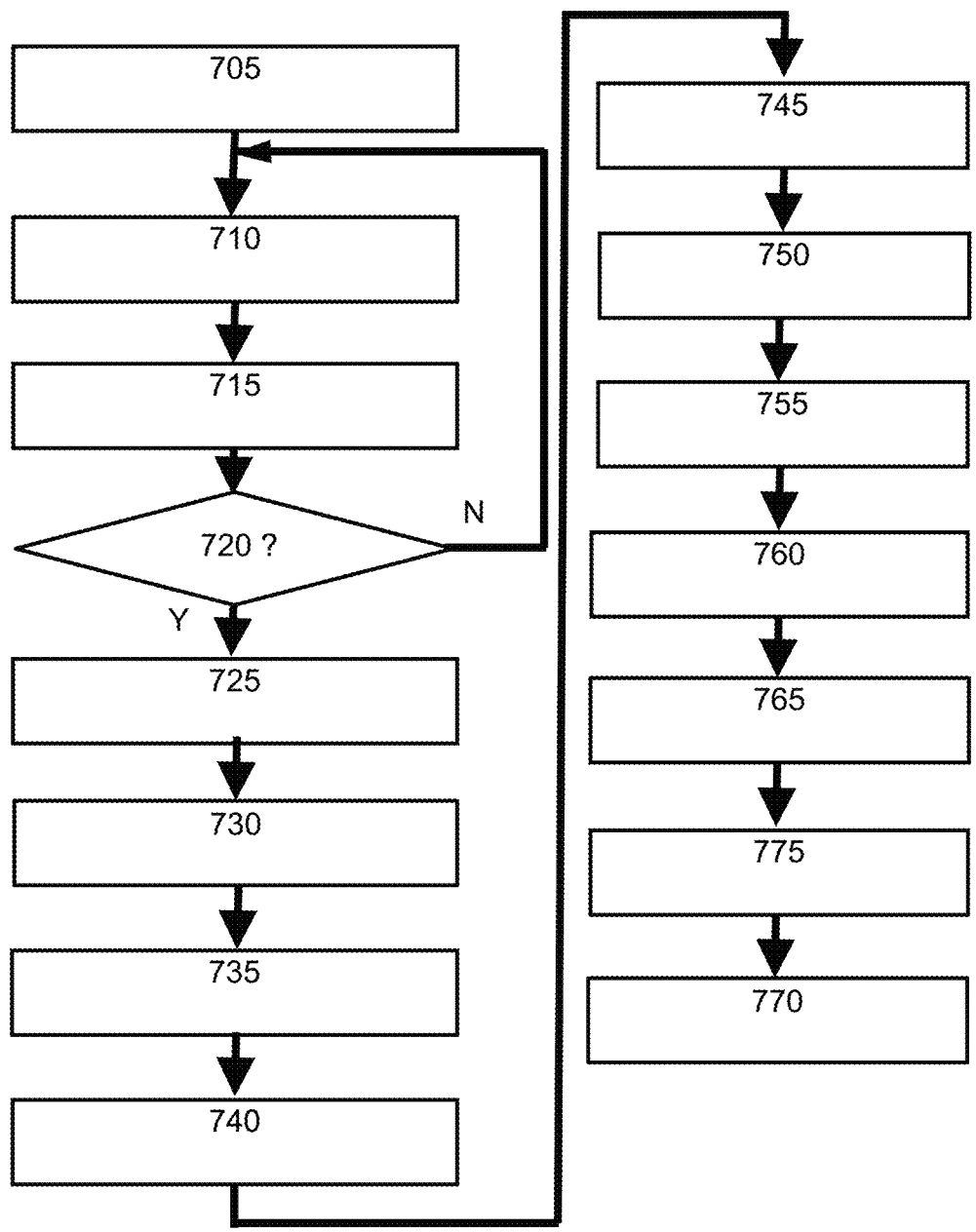
FIG. 7 is a radio frequency deception network method flowchart configured in accordance with an embodiment.

FIG. 7 is a flowchart 700 for a radio frequency deception network method. Steps comprise initiating controller operation 705; identifying a victim receiver 710; entering victim receiver characteristics including location 715; determining if all victim receivers have been identified 720; if yes, continue, if no, return to 710; determine deception target characteristics for each identified victim receiver 725; determine combined wavefront characteristics required 730; determine number of platforms to be used 735; determine each platform's relative location 740; determine platform waveform characteristics required for each platform 745; deploy platforms 750; locate each platform with respect to the/each victim receiver according to interrelationships to define the combined wavefront 755; orient each platform according to interrelationships to define the combined wavefront 760; synchronize platform clocks 765; configure each platform's transmission characteristics for each predetermined platform wavefront 770; and transmit synchronized predetermined platform wavefront from each platform 775.

The computing system used for the distributed transmit platform deception network array for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A distributed transmit platform deception network array system comprising:
    a plurality of platforms;
    each of said platforms comprising at least one transmitter;
    wherein said platforms are in a geographically distributed configuration with respect to each other and at least one victim receiver;
    a propagating wavefront generated by said transmitters of said plurality of platforms toward said at least one victim receiver;
    whereby said propagating wavefront is controlled according to deception target characteristics for each said at least one victim receiver, and a false location is determined by said at least one victim receiver; and
    whereby detection of a deception at alternate receiver locations is minimized by selection of characteristics of a transmitted waveform.

2. The system of claim 1 wherein said platforms comprise one or more towers comprising said transmitters, providing base defense electronic warfare.

3. The system of claim 1 wherein said generating said transmissions by said platforms comprises performing an optimization over their transmit signals.

4. The system of claim 1 wherein said victim receiver comprises a passive receiving detection system.

5. The system of claim 1 wherein said system comprises coherent transmit beamforming.

6. The system of claim 1 wherein said victim receiver comprises a phased array.

7. The system of claim 1 wherein said platforms comprise at least one attritable platform.

8. The system of claim 1 wherein said platforms comprise at least one Tier II Medium Altitude, Long Endurance (MALE) platform.

9. The system of claim 1 wherein said platforms comprise a swarm of drones.

10. The system of claim 1 wherein said transmission comprises persistent flight of said plurality of platforms.

11. The system of claim 1 comprises Digital Radio Frequency Memories (DRFM) units.

12. The system of claim 1 wherein said plurality of platforms comprises autonomous unmanned aerial vehicles (UAVs).

13. The system of claim 1 wherein said plurality of platforms comprises unmanned aerial vehicles (UAVs) capable of hovering.

14. The system of claim 1 wherein said plurality of platforms are beyond a range of victim target weapons.

15. A distributed transmit platform deception network array apparatus comprising:
- a plurality of unmanned aerial vehicle (UAV) platforms;
- a controller comprising at least one transceiver and antenna for controlling said plurality of platforms, said controller determining deception target characteristics for each identified victim receiver;
- each said platform comprising at least one transceiver and antenna;
- wherein said platforms are in a predefined spaced-apart configuration with respect to each other and at least one said victim receiver;
- a propagating wavefront generated by said transceivers of said plurality of platforms toward said at least one victim receiver and controlled according to said deception target characteristics for each said identified victim receiver;
- whereby said propagating wavefront is controlled, and a false location is determined by said at least one victim receiver.

* * * * *